United States Patent
Paik et al.

(10) Patent No.: US 7,483,113 B2
(45) Date of Patent: Jan. 27, 2009

(54) LIQUID CRYSTAL DISPLAY DEVICE AND METHOD FOR MANUFACTURING THE SAME

(75) Inventors: Sang Yoon Paik, Gyeonggi-do (KR); Joon Youp Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 305 days.

(21) Appl. No.: 11/475,214

(22) Filed: Jun. 27, 2006

(65) Prior Publication Data

US 2007/0139604 A1 Jun. 21, 2007

(30) Foreign Application Priority Data

Dec. 15, 2005 (KR) ................ 10-2005-0123660

(51) Int. Cl.
*G02F 1/1339* (2006.01)
(52) U.S. Cl. ................... 349/156; 349/155
(58) Field of Classification Search .......... 349/155–157
See application file for complete search history.

(56) References Cited

U.S. PATENT DOCUMENTS

| 6,690,441 | B2* | 2/2004 | Moriya ................ 349/130 |
| 2005/0185129 | A1* | 8/2005 | Kim et al. ............. 349/156 |
| 2007/0115420 | A1* | 5/2007 | Chu et al. ............. 349/155 |
| 2007/0216847 | A1* | 9/2007 | Chang et al. .......... 349/155 |

FOREIGN PATENT DOCUMENTS

| CN | 1661424 A | 8/2005 |
| CN | 1693977 A | 11/2005 |
| JP | 2005-107452 A | 4/2005 |

* cited by examiner

*Primary Examiner*—Hemang Sanghavi
(74) *Attorney, Agent, or Firm*—Holland & Knight LLP

(57) ABSTRACT

A liquid crystal display device includes first and second substrates bonded to each other, first column spacers on the first substrate, protrusions on the second substrate that contact a center portion of an upper surface of the spacers, respectively, recesses formed in the second substrate surrounding the protrusions, respectively, and a liquid crystal layer between the first and second substrates.

11 Claims, 9 Drawing Sheets

LIQUID CRYSTAL DISPLAY DEVICE AND METHOD FOR MANUFACTURING THE SAME

This application claims the benefit of the Korean Patent Application No. P2005-0123660, filed on Dec. 15, 2005, which is hereby incorporated by reference in its entirety.

BACKGROUND OF THE INVENTION

1. Field of the Invention

The present invention relates to a display device, and more particularly, to a liquid crystal display device and a method for manufacturing the same. Although the present invention is suitable for a wide scope of applications, it is particularly suitable for preventing a touch defect, and a method for manufacturing the same.

2. Discussion of the Related Art

The development of information-dependent society has increased the demand for various types of display devices. To fulfill the demand, efforts have been made to research flat panel display devices, such as a liquid crystal display (LCD) device, a plasma display panel (PDP), an electro-luminescent display (ELD), and a vacuum fluorescent display (VFD). Some of these flat panel display devices are being practically applied in various display purposes.

Among the above mentioned display devices, LCD devices have been used as a substitute for cathode ray tubes (CRTs) because they have advantages of superior picture quality, light weight, thin profile, and low energy consumption. Thus, LCD devices are currently the most widely used type of flat panel display device. Various applications of LCD devices are being developed in association with not only mobile image display devices, such as monitors of notebook computers, but also in the monitors of televisions, which receive and display broadcast signals. Successful application of such LCD devices to a diverse group of different types of image display devices depends on whether or not the LCD devices can realize high picture quality, including high resolution, high brightness, large display area, and the like, while maintaining the characteristics of light weight, thin profile, and low power consumption. Hereinafter, a related art LCD device will be explained in reference to FIGS. 1 to 3.

FIG. 1 is an exploded perspective view illustrating an LCD device according to the related art. As shown in FIG. 1, the LCD device includes a first substrate 1 and a second substrate 2 bonded to each other such that a gap is defined between the first and second substrates 1 and 2. The LCD device also includes a liquid crystal layer 3 sealed in the gap between the first and second substrates 1 and 2.

The first substrate 1 of the LCD device in FIG. 1 includes a plurality of uniformly spaced apart gate lines 4 arranged in a first direction and a plurality of uniformly spaced apart data lines 5 arranged in a direction perpendicular to the first direction of the gate lines 4. The gate lines 4 and data lines 5 define pixel regions P. The first substrate 1 also includes pixel electrodes 6 arranged in each of the respective pixel regions P, and thin film transistors T respectively formed at each crossing of the gate lines 4 and data lines 5. Each thin film transistor T transmits a signal from an associated one of the data lines 5 to an associated one of the pixel electrodes 6 in accordance with a signal from an associated one of the gate lines 4.

The second substrate 2 of the LCD device in FIG. 1 includes a black matrix layer 7 for blocking light through regions of the second substrate 2 other than the pixel regions P. The second substrate 2 also includes red R, green G, and blue B color filter layers 8 respectively formed at regions corresponding to the pixel regions P for expressing red, green and blue color tones. A common electrode 9 is formed to cover the color filter layers 8 for controlling an electric field across the liquid crystal layer 3 together with the pixel electrodes 6.

In each pixel region P, liquid crystal molecules of the liquid crystal layer 3 interposed between the first and second substrates 1 and 2 are oriented in accordance with the electric field generated between the associated pixel electrode 6 and the common electrode 9. The amount of light passing through the liquid crystal layer 3 corresponds to the orientation degree of the liquid crystal molecules of the liquid crystal layer 3,. Thus, a corresponding image can be expressed by controlling the orientation of the liquid crystal molecules of the liquid crystal layer 3 in each of the pixels P. Such an LCD device is called a "twisted nematic (TN) mode LCD device". A TN mode LCD device has the drawback of having a narrow viewing angle. However, an in-plane switching (IPS) mode LCD device has been developed to overcome this drawback of the TN mode LCD device.

In the IPS mode LCD device, a pixel electrode and a common electrode are formed on a first substrate in each pixel region of the first substrate such that the pixel electrode and common electrode extend parallel to each other. An in-plane electric field (i.e., horizontal field) can be generated between the pixel electrode and a common electrode. The orientation of the liquid crystal molecules of the liquid crystal layer is controlled by the in-plane electric field.

To maintain a uniform cell gap for the liquid crystal layer, spacers are provided between the first and second substrates of the LCD devices having the above described configurations. The spacers are classified into either ball spacers or column spacers depending on their shape. The ball spacers have a spherical shape, and are scattered between the first and second substrates. Even after the first and second substrates are bonded to each other, the ball spacers are free to move about in the liquid crystal layer. Further, the ball spacers have a small contact area with respect to the first and second substrates. On the other hand, the column spacers are formed during an array process of either the first or second substrate. The column spacers are affixed on one of the substrates. Further, the column spacers have a cylindrical shape with a certain height to maintain the cell gap. Accordingly, the column spacers have a relatively large contact area with respect to the first and second substrates as compared to the ball spacers.

FIG. 2 is a plan view illustrating a related art LCD device including column spacers. FIG. 3 is a cross-sectional configuration view taken along line I-I' of FIG. 2. As shown in FIGS. 2 and 3, an array region of the related art LCD device includes a plurality of gate lines 4 and data lines 5 arranged perpendicular to each other to define pixel regions, thin film transistors (TFT) formed at each of the crossings of the gate lines 4 and data lines 5, and pixel electrodes 6 formed in each of the respective pixel regions. The related art LCD device also includes column spacers 20 for maintaining the cell gap. FIG. 2 illustrates that three sub pixels, more particularly, R, G, and B sub pixels, constitute one pixel, and each pixel is provided with one column spacer 20.

Referring to FIG. 3, each column spacer 20 is formed at a corresponding position over the associated gate line 4. Specifically, the gate line 4 is formed on the first substrate 1, and then, a gate insulation film 15 is formed over the entire surface of the substrate 1, including the gate line 4. Thereafter, a passivation film 16 is formed over the gate insulation film 15.

The second substrate 2 includes the black matrix layer 7 for covering non-pixel regions (regions corresponding to gate lines, data lines, and thin film transistors) other than the pixel regions, and the red R, green G, and blue B color filter layers 8 formed over the color filter substrate 2, including the black matrix layer 7. The red R, green G, and blue B color filter layers 8 are formed by applying red, green, and glue pigments to regions of the substrate 2 corresponding to the respective pixel regions in sequence. The second substrate 2 also includes a common electrode 14 formed over the entire surface of the second substrate 2, including the color filter layers 8. After the column spacer 20 is arranged over the common electrode 14 at a position corresponding to the gate line 4, the two substrates 1 and 2 are then bonded to each other such that the column spacer 20 is located over the gate line 4.

In the above described related art LCD device having the column spacer 20, if a surface of the LCD device is touched with a finger or object along a certain direction, a spot is generated at the touched portion. The spot may be called a "touch spot" because it is generated by a touch action, or may be called a "touch defect" because it is observed on the screen where a touch occurred. The reason why the touch defect occurs in the LCD device having the column spacer 20 is that the column spacer 20 and the first substrate 1 facing the column spacer 20 have a large contact area as compared to the related art ball spacer, resulting in a large frictional force causing the touch defect. That is, since the column spacer 20, having a cylindrical shape, has a larger contact area with the first substrate 1 than a ball spacer, when first and second substrates 1 and 2 are shifted relative to each other by a touch action, the large frictional force of the larger contact area prevents a return to their original state, resulting in generation of long-lasting spots.

SUMMARY OF THE INVENTION

Accordingly, the present invention is directed to an LCD device and a method for manufacturing the same that substantially obviate one or more problems due to limitations and disadvantages of the related art.

An object of the present invention is to provide a liquid crystal display device capable of preventing a touch defect, and a method for manufacturing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes first and second substrates bonded to each other, first column spacers on the first substrate, protrusions on the second substrate that contact a portion of an upper surface of the first column spacers, recesses in the second substrate surrounding the protrusions, and a liquid crystal layer between the first and second substrates.

In accordance with another aspect of the present invention, there is provided a method for manufacturing a liquid crystal display device having a first and second substrates comprising forming a plurality of gate lines and gate electrodes on the first substrate, forming a gate insulation film over the first substrate, including the gate lines and gate electrodes, forming semiconductor layers on the gate insulation film over the gate electrodes, and simultaneously forming first protrusion patterns on the gate insulation film, forming a plurality of data lines on the gate insulation film perpendicular to the gate lines such that the data lines and gate lines define pixel regions, and simultaneously forming source and drain electrodes, and second protrusion patterns on the first protrusion pattern, forming a passivation film over the surface of the gate insulation film, including the data lines, source and drain electrodes, and first and second protrusion patterns, forming contact holes for exposing the drain electrodes to the outside, and recesses around the respective first protrusion patterns on the gate lines by selectively removing the passivation film, forming pixel electrodes contacting drain electrodes via the contact holes, forming a color filter array on the second substrate, forming the plurality of first column spacers on the second substrate at positions corresponding to the respective protrusions, and a plurality of second column spacers on the second substrate at positions of the second substrate corresponding to regions of the gate lines other than where protrusions are formed, and forming a liquid crystal layer between the first and second substrates.

In accordance with yet another aspect of the present invention, there is provided a method for manufacturing a liquid crystal display device that includes forming gate lines with protruding gate electrodes and common lines with protruding common electrodes on the first substrate, forming a gate insulation film over the first substrate, including the gate lines and gate electrodes, forming semiconductor layers on the gate insulation film over the gate electrodes, and simultaneously forming first protrusion patterns on the gate insulation film at predetermined positions on the gate insulation film, forming a data lines on the gate insulation film perpendicular to the gate lines such that the data lines and gate lines define pixel regions, and simultaneously forming source and drain electrodes overlapping the semiconductor layers, and second protrusion patterns on the first protrusion pattern, forming a passivation film over the gate insulation film, including the data lines, source and drain electrodes, and first and second protrusion patterns, forming a plurality of contact holes for exposing the drain electrodes, and a plurality of recesses around each of the first protrusion patterns on the gate lines via selective removal of the passivation film, forming pixel electrodes contacting drain electrodes via the contact holes; forming a color filter array on the second substrate; forming the plurality of first column spacers on the second substrate at positions corresponding to the respective protrusions, and a plurality of second column spacers on the second substrate at positions of the second substrate corresponding to regions of the gate lines other than where protrusions are formed; and forming a liquid crystal layer between the first and second substrates It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
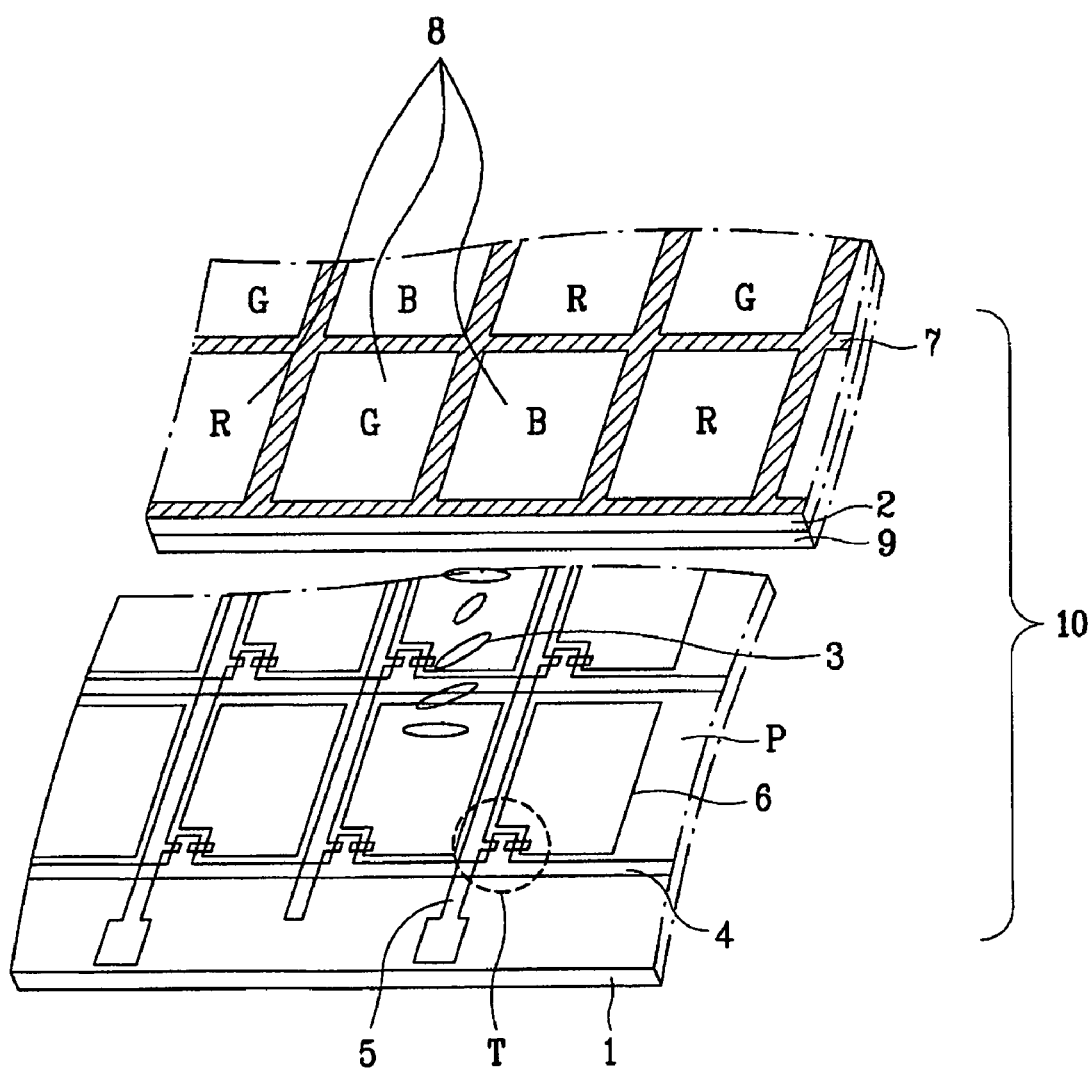
FIG. 1 is an exploded perspective view illustrating a related art liquid crystal display device.
Figure 2:
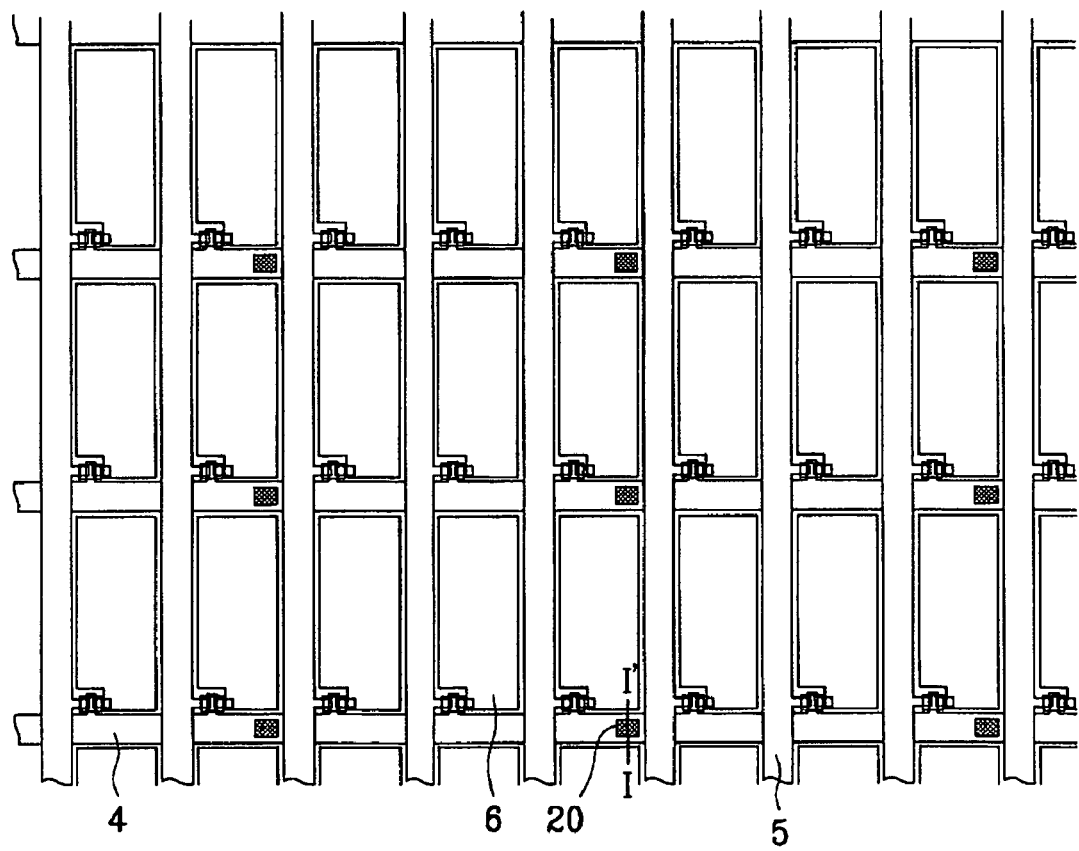
FIG. 2 is a plan view illustrating a related art liquid crystal display device including column spacers.
Figure 3:
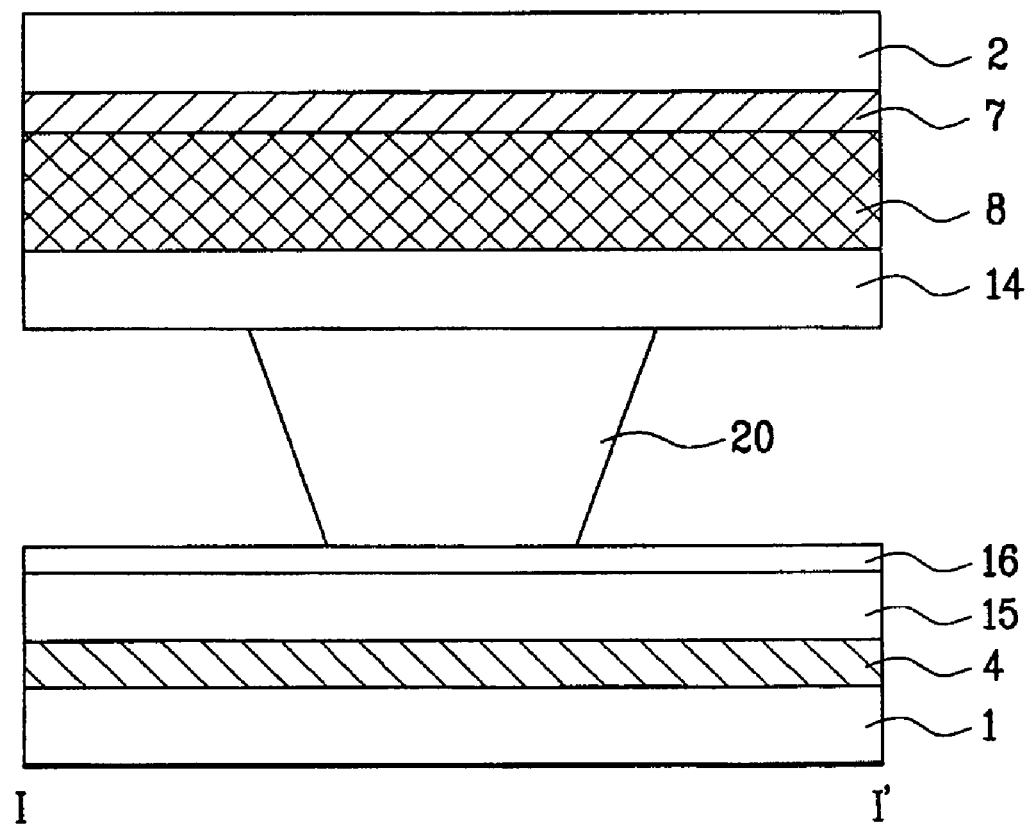
FIG. 3 is a cross-sectional configuration view taken along line I-I' of FIG. 2.
Figure 4:
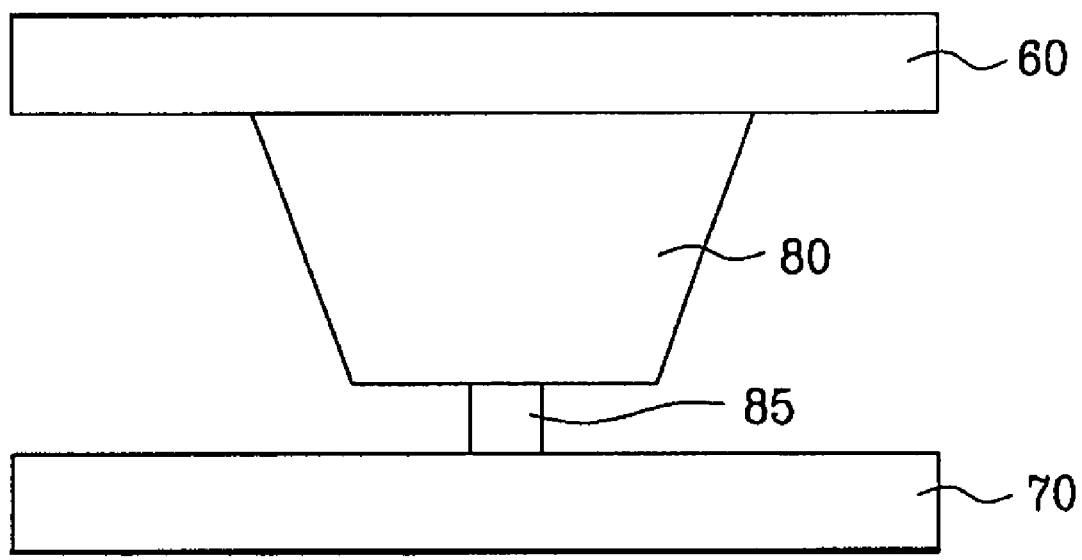
FIG. 4 is a cross-sectional view illustrating a liquid crystal display (LCD) device using protrusions.

FIG. 4 is a cross-sectional view illustrating a liquid crystal display (LCD) device using protrusions. As shown in FIG. 4, the LCD device of a type including an arrangement of protrusions includes first and second substrates 70 and 60 arranged to face each other, at least one column spacer 80 formed on the second substrate 60 at a predetermined position of the second substrate 60, a protrusion 85 formed on the first substrate 70 that contacts a central portion of the upper surface of the column spacer 80, the protrusion 85 having a top surface with a smaller area than that of an upper surface of the column spacer 80, and a liquid crystal layer (not shown) filled between the first and second substrates 70 and 60. Here, the term "the upper surface" is named in relation to the second substrate 60 having the column spacer 80 such that the upper surface of the column spacer 80 is a surface facing the protrusion 85 and a lower surface of the column spacer 80 is a surface facing the second substrate 60.

Since the protrusion 85, which is interposed between the column spacer 80 and the first substrate 70, has a top surface with a smaller area than that of the upper surface of the column spacer 80, a contact area between the protrusion 85 and the column spacer 80 is small due to the smaller area of the top surface of the protrusion 85. With such an arrangement, when a surface of the first substrate 70 or second substrate 60 is temporarily touched or continuously rubbed by a finger in one direction such that the first and second substrates 70 and 60 are shifted relative to each other, the column spacer 80 has a reduced frictional area with the protrusion 85, resulting in a reduction in frictional force between the column spacer 80 and the protrusion 85. Accordingly, even if the first and second substrates 70 and 60 are shifted relative to each other by a touch action, they can easily return to their original state. Thus, an LCD device having the protrusion 85 in which the top surface has a smaller area than that of the upper surface of the column spacer 80 can eliminate the risk of a touch defect that occurs in LCD devices using column spacers 80.

The protrusion 85, which has a relatively small volume and a top surface with a small area, is initially positioned at the center of the column spacer 80. However, the protrusion 85 has a problem in that, if an excessive pressure force is applied to the first or second substrate 70 or 60, the force is concentrated on a center region of the upper surface of the column spacer 80 corresponding to the protrusion 85, and the remaining region of the upper surface of the column spacer 80 not corresponding to the protrusion 85 can be brought into contact with the first substrate 70 facing the column spacer 80. This disadvantageously increases contact area as compared to a configuration wherein only protrusion comes into contact with a substrate facing thereto, and therefore, results in an increased frictional force and a touch defect. Hereinafter, embodiments according to the present invention capable of preventing the above described touch defect problem will be explained.

Figure 5A:
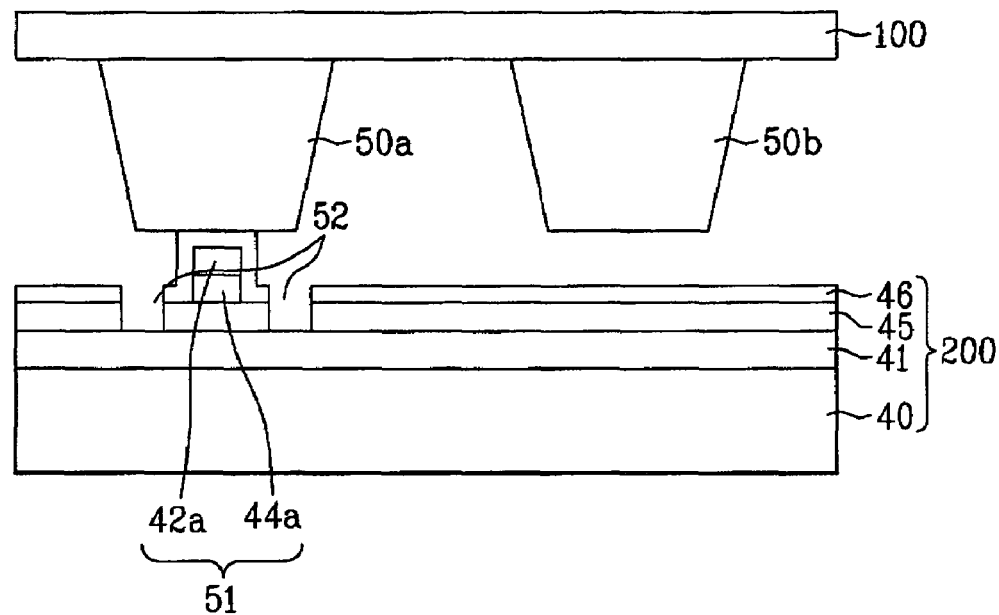
FIGS. 5A and 5B are a cross-sectional view and a plan view, respectively, illustrating the relationship of a column spacer, protrusion, and recess in accordance with a first embodiment of the present invention.
Figure 5B:
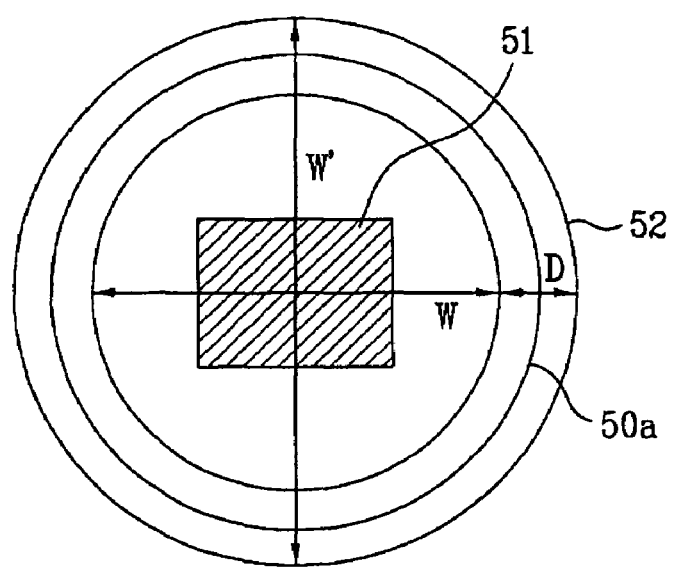

FIGS. 5A and 5B are a cross-sectional view and a plan view, respectively, illustrating the relationship of a column spacer, protrusion, and recess in accordance with a first embodiment of the present invention. As shown in FIG. 5A, the LCD device with a recess includes first and second substrates 200 and 100 arranged to face each other, first and second uniformly spaced apart column spacers 50a and 50b arranged at predetermined positions on the second substrate 100 and having the same height as each other; a protrusion 51 formed on the first substrate 200 contacting a center portion of the first column spacer 50a and having a top surface with a smaller area than an upper surface of the first column spacer 50a (here, the upper surface being a surface corresponding to the protrusion 51), a recess 52 formed in the first substrate 200 to surround the protrusion 51 and have an outer periphery beyond the corresponding periphery of the upper surface of the first column spacer 50a, and a liquid crystal layer (not shown) between the first and second substrates 200 and 100.

As shown in FIG. 5B, the recess 52 has an outer diameter (OD) W' greater than the overall diameter of the corresponding upper surface of the first column spacer 50a and an inner diameter (ID) W less than the overall diameter of the corresponding upper surface of the first column spacer 50a. The outer and inner diameters W' and W having a difference D. The inner diameter W is wider than the protrusion 51, and the outer diameter W' is wider than a diameter of the upper surface of the first column spacer 50a. Since the protrusion 51 is positioned to correspond to a center portion of the upper surface of the first column spacer 50a, a periphery of the upper surface of the first column spacer 50a is correspondingly within the recess 52.

The recess 52 may be formed via patterning of a gate insulation film 45 and passivation film 46, which are stacked on a glass substrate 40 of the first substrate 200 in sequence, or by patterning of only the passivation film 46.

The second column spacer 50b is spaced apart from the first substrate 200 by a predetermined gap due to the protrusion 51 coming into contact with the first column spacer 50a.

In embodiments of the present invention having the recess 52, if an excessive pressure force is applied to a surface of the first or second substrate 200 or 100, the first column spacer 50a only contacts the protrusion 51 and does not come into contact with any other portion of the second substrate 200. Therefore, a gap is maintained between the first substrate 200 and the second substrate 100 without an increase in contact area between elements of the first substrate 200 and the second substrate 100. This has the effect of reducing the risk of a touch defect caused by an increased contact area between the upper surface of the first column spacer 50a and an element other than the protrusion 51 of the first substrate 200 from coming into contact.

Figure 6:
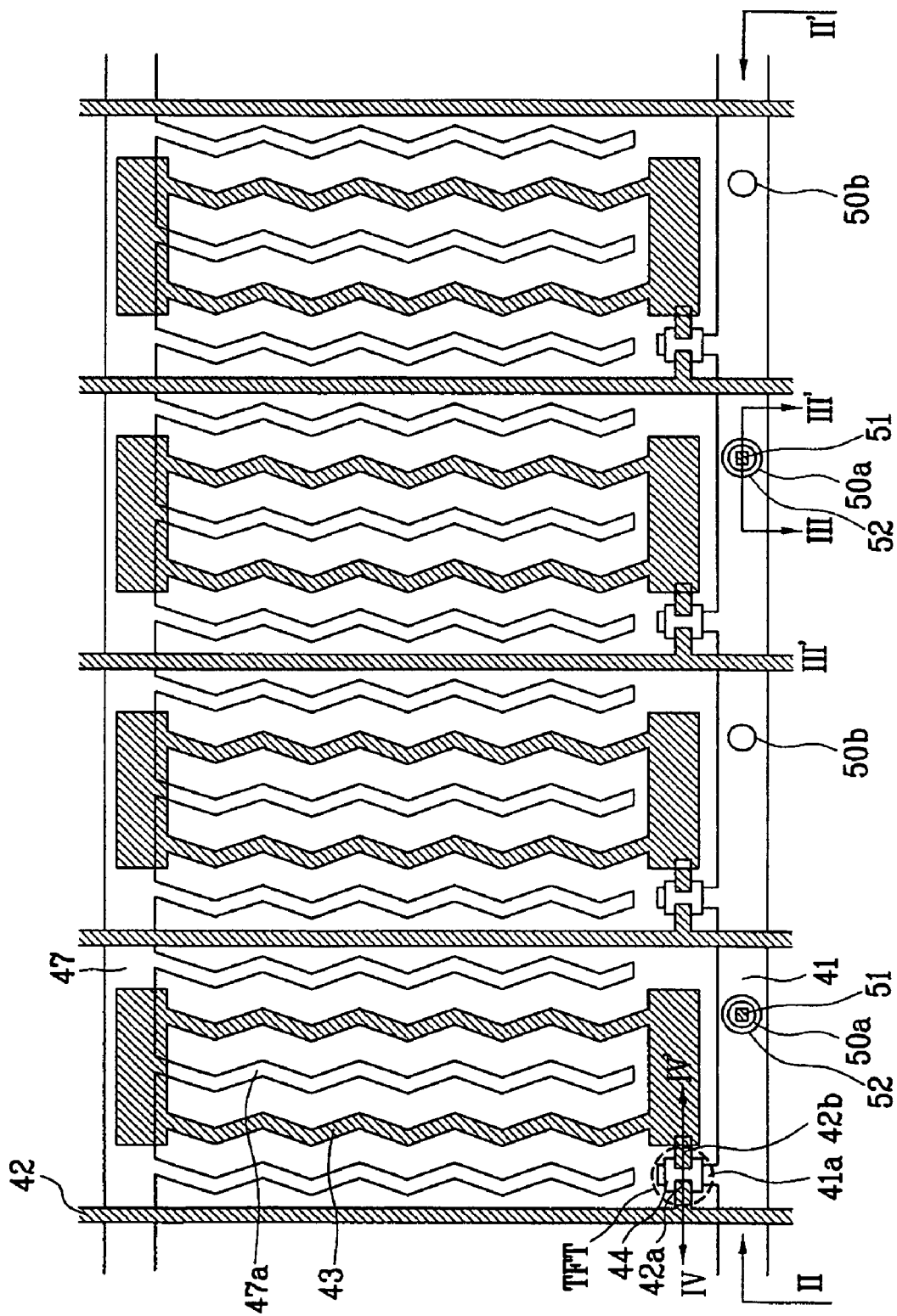
FIG. 6 is a plan view illustrating a liquid crystal display device in accordance with a first embodiment of the present invention.
Figure 7:
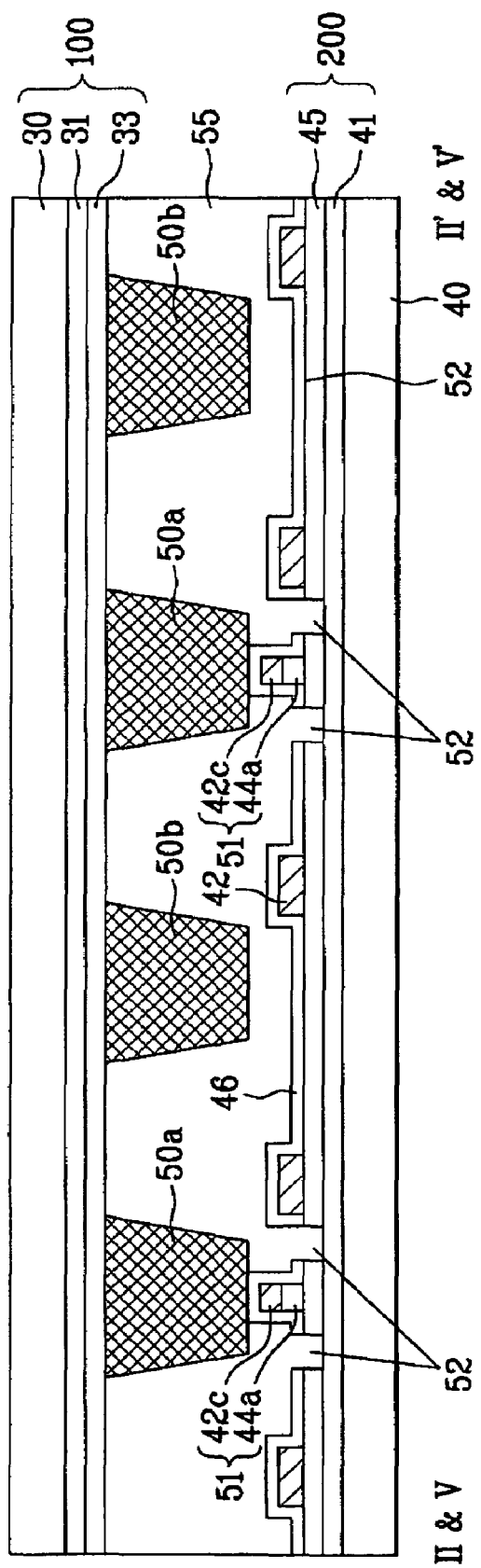
FIG. 7 is a cross-sectional view taken along line II-II' of FIG. 6.

FIG. 6 is a plan view illustrating an LCD device in accordance with a first embodiment of the present invention. FIG. 7 is a cross-sectional view taken along line II-II' of FIG. 6. As shown in FIGS. 6 and 7, the LCD device according to the first embodiment of the present invention, which is operable in an IPS mode, includes first and second substrates 100 and 200 arranged to face each other, and a liquid crystal layer 55 between the first and second substrates 100 and 200.

The first substrate 100, which is a color filter substrate, includes a black matrix layer 31 formed on a first glass substrate 30 for blocking light through regions (corresponding to gate lines, data lines, and thin film transistors) other than pixel regions; a red R, green G, and blue B color filter layers (not shown) corresponding to the pixel regions for creating color tones; and an overcoat layer 33 formed over the entire surface of the first substrate 100, including the black matrix layer 31 and color filter layers (not shown). A plurality of first and second column spacers 50a and 50b are formed on the overcoat layer 33 at predetermined positions of the overcoat layer 33. The first and second column spacers 50a and 50b are made of photosensitive resin.

The second substrate 200, which is a TFT substrate facing the color filter substrate 100, includes a plurality of gate lines 41 and data lines 42 arranged on a second glass substrate 40 perpendicular to each other to define the pixel regions, common lines 47 arranged parallel to the gate lines 41, uniformly spaced apart common electrodes 47a protruding from the common lines 47 into the pixel regions, and pixel electrodes 43 extending parallel to the common electrodes 47a between the common electrodes 47a. The second substrate 200 also includes thin film transistors (TFTs) formed at crossings of the gate lines 41 and data lines 42. Each of the TFTs have a source electrode 42a connected to one of the data lines 42, a gate electrode 41a connected to one of the gate lines 41, and a source electrode 42b connected to one of the pixel electrodes 43.

A plurality of protrusions 51 are arranged on the gate lines 41 at positions corresponding to the first column spacers 50a. The protrusions 51 are formed by depositing semiconductor layer 44 and a data line material. More specifically, each of the protrusions 51 has a laminated structure including a first protrusion pattern 44a and a second protrusion pattern 42c over the first protrusion pattern 44a. The first protrusion pattern 44a is formed by patterning the semiconductor layer 44 formed on the gate insulation film 45, and the second protrusion pattern 42c is formed simultaneously when the source and drain electrodes 42a and 42b are formed at opposite sides of the respective patterned semiconductor layers 44.

In association with each protrusion 51 contacting a center portion of an upper surface of an associated one of the first column spacers 50a, a recess 52 is formed in the second substrate 200 to surround the protrusion 51. That is, the recess 52 is configured to have an outer periphery beyond the corresponding periphery of the upper surface of the first column spacer 50a and inner periphery within the corresponding periphery of the upper surface of the first column spacer 50a. The recess 52 can be formed via patterning of the gate insulation film 45 and passivation film 46, which are stacked on the second glass substrate 40 of the first substrate 200 in sequence, or via patterning of only the passivation film 46.

The manufacture of the TFT, pixel electrode, and recess begins by depositing a metal material, such as Mo, Al or Cr, over the second glass substrate 40. The metal material is then patterned via a photolithography process to form the plurality of gate lines 41, gate electrodes 41a, common lines 47, and common electrodes 47a simultaneously. More specifically, the gate electrodes 41a protrude from the gate lines 41 at predetermined positions in the pixel regions.

Then, an insulation material, such as SiNx, is deposited over the glass substrate 40, including the gate lines 41, gate electrodes 41a, common lines 47, and common electrodes 47a, to form the gate insulation film 45. Thereafter, a semiconductor layer is deposited on the gate insulation film 45. The deposited semiconductor layer is then patterned to form the semiconductor layers 44 on the gate insulation film 45 over the gate electrodes 41a. By patterning the semiconductor layers 44, the first protrusion patterns 44a of the protrusions 51 are formed on the gate insulation film 45 at positions corresponding to the first column spacers 50a, respectively.

The semiconductor layers 44 are formed by sequentially depositing an amorphous silicon layer or a poly-silicon layer and a silicon layer doped with an impurity, and subsequently, patterning both the amorphous silicon layer(or poly-silicon layer) and doped silicon layer at the same time. A metal material, such as Mo, Al or Cr, is then deposited and patterned via a photolithography process to form the plurality of data lines 42 perpendicular to the gate lines 41. Then, the source and drain electrodes 42a and 42b are formed to be in contact with opposite sides of the respective semiconductor layers 44, and simultaneously, the second protrusion patterns 42c are formed on the first protrusion patterns 44a, respectively. As a result, the plurality of protrusions 51 are formed of the first protrusion patterns 44a and second protrusion patterns 42c. The source electrodes 42a protrude from the data lines 42a.

Subsequently, the passivation film 46 is deposited over the entire surface of the second substrate 200, including the source and drain electrodes 42a and 42b. Although the passivation film can be made of an inorganic material, such as SiNx, an organic material having a low dielectric constant, such as BenzoCycloButene (BCB), Spin On Glass (SOG), or Acryl, can instead be used to improve the aperture ratio of liquid crystal cells. Predetermined regions of the passivation film 46 over the drain electrodes 42b are then selectively etched to form drain contact holes (designated as reference numeral 54 in FIG. 8B) exposing a part of the respective drain electrodes 42b to the outside. Simultaneously during the formation of the drain contact holes 54, the recesses 52 are formed by removing certain regions of the passivation film 46 and gate insulation film 45 such that the periphery of the upper surface of each of the first column spacers 50a is directly above a corresponding recess 52.

Figure 8A:
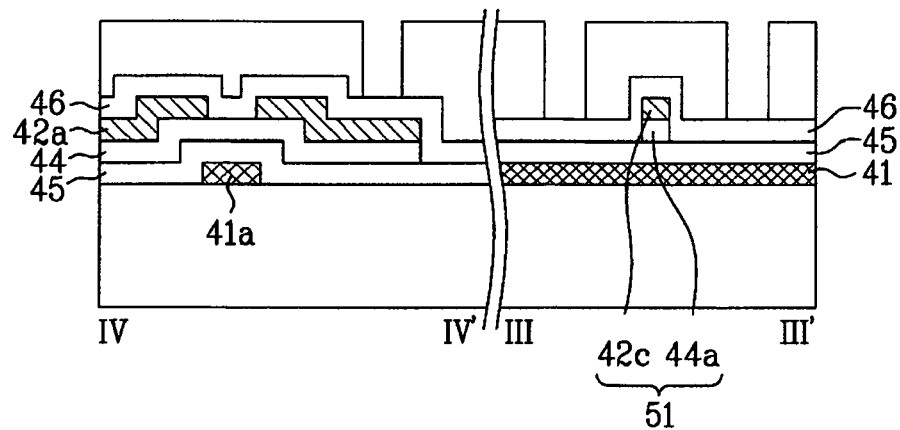
FIGS. 8A to 8C are cross-sectional views illustrating sequential processes of a method for manufacturing the liquid crystal display device in accordance with the first embodiment of the present invention.
Figure 8B:
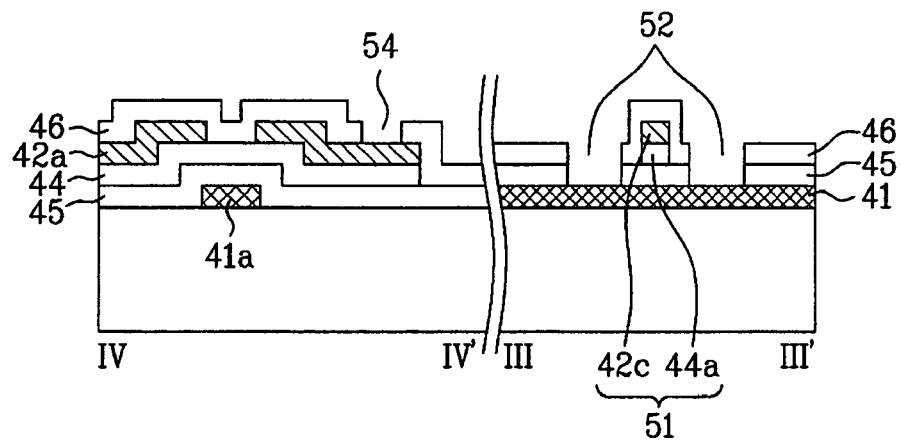
Figure 8C:
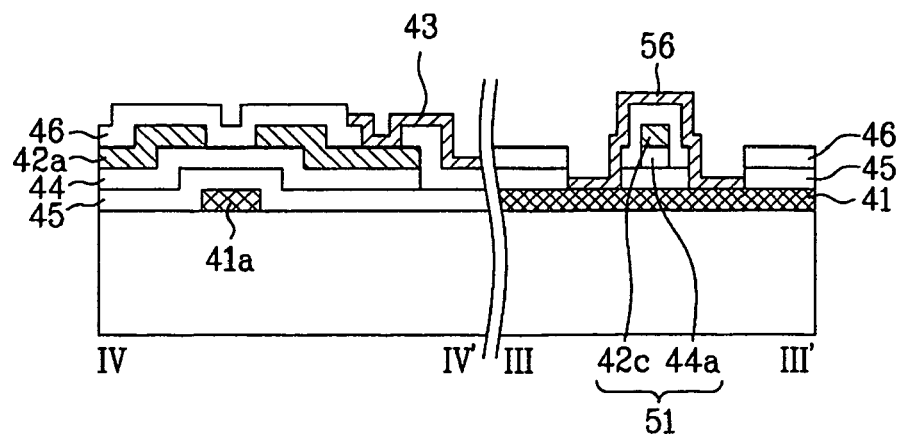

FIGS. 8A to 8C are cross-sectional views illustrating sequential processes of a method for manufacturing the liquid crystal display device in accordance with the first embodiment of the present invention. The formation of the drain contact holes and recesses will be explained with reference to FIGS. 8A and 8B. FIG. 8A is a cross-sectional view taken along line IV-IV' of FIG. 6, and FIG. 8A is a cross-sectional view taken along the line III-III' of FIG. 6.

As shown in FIG. 8A, after a photoresist is applied to the passivation film 46, the photoresist is subjected to exposure and development processes, to form photoresist patterns PR for use in the formation of the drain contact holes and recesses.

Subsequently, as shown in FIG. 8B, the passivation film 46 is patterned by using the photoresist patterns PR as a mask, to form the drain contact holes 54 exposing the drain electrodes 42b to the outside. Simultaneously, both the passivation film 46 and gate insulation film 45 are patterned by using the photoresist patterns PR as a mask, to form the recesses 52. Thereafter, the remaining photoresist patterns PR are completely removed. In this way, the recesses 52 are formed to correspond to the peripheral regions of the upper surfaces of the respective first column spacers 50a.

Next, a transparent conductive film 56 is deposited over the passivation film 46, so as to be electrically connected to the drain electrodes 42b through the drain contact holes 54. The deposited transparent conductive film 56 is then selectively removed, to form the pixel electrodes 43 in the respective pixel regions. Specifically, the pixel electrodes are formed such that they are connected to the drain electrodes 42b while extending parallel to the common electrodes 47a between the common electrodes 47a.

As shown in FIG. 8C, the transparent conductive film 56, which is deposited for forming the pixel electrodes 43, can also be deposited over the recesses 52 and the passivation film 56 on the protrusion 51. Thus, the transparent conductive film 56 serves as a protective film for the gate electrodes 41a exposed in the recesses 52.

Although not shown, processes for forming orientation films over the color filter array substrate 100 having the first and second column spacers 50a and 50b and over the TFT array substrate 200 having the recesses 52, respectively, may be included in the TFT array process and color filter array process.

Although the above description explains that the column spacers are formed on the color filter substrate and the recesses are formed on the TFT substrate, embodiments of the present invention are not limited thereto, and it should be understood that the column spacers may be formed on the TFT substrate and the recesses may be formed on the color filter substrate.

In embodiments of the present invention using the structure of recesses, if an excessive pressure is applied to a surface of the first or second substrate, the upper surface of each first column spacer 50a still only contacts the protrusion 51 because of the recess 52 surrounding the protrusion. Therefore, a gap is maintained between the first substrate 200 and the second substrate 100 without an increase in contact area between elements of the first substrate 200 and the second substrate 100. This has the effect of reducing the risk of a touch defect caused by an increased contact area between the region of the upper surface of the first column spacer 50a and other elements of the first substrate 200 facing the first column spacer 50a. Although the first embodiment of the present invention illustrates the IPS mode LCD device, the present invention is not limited thereto, but may be applied to a TN mode LCD device.

Figure 9:
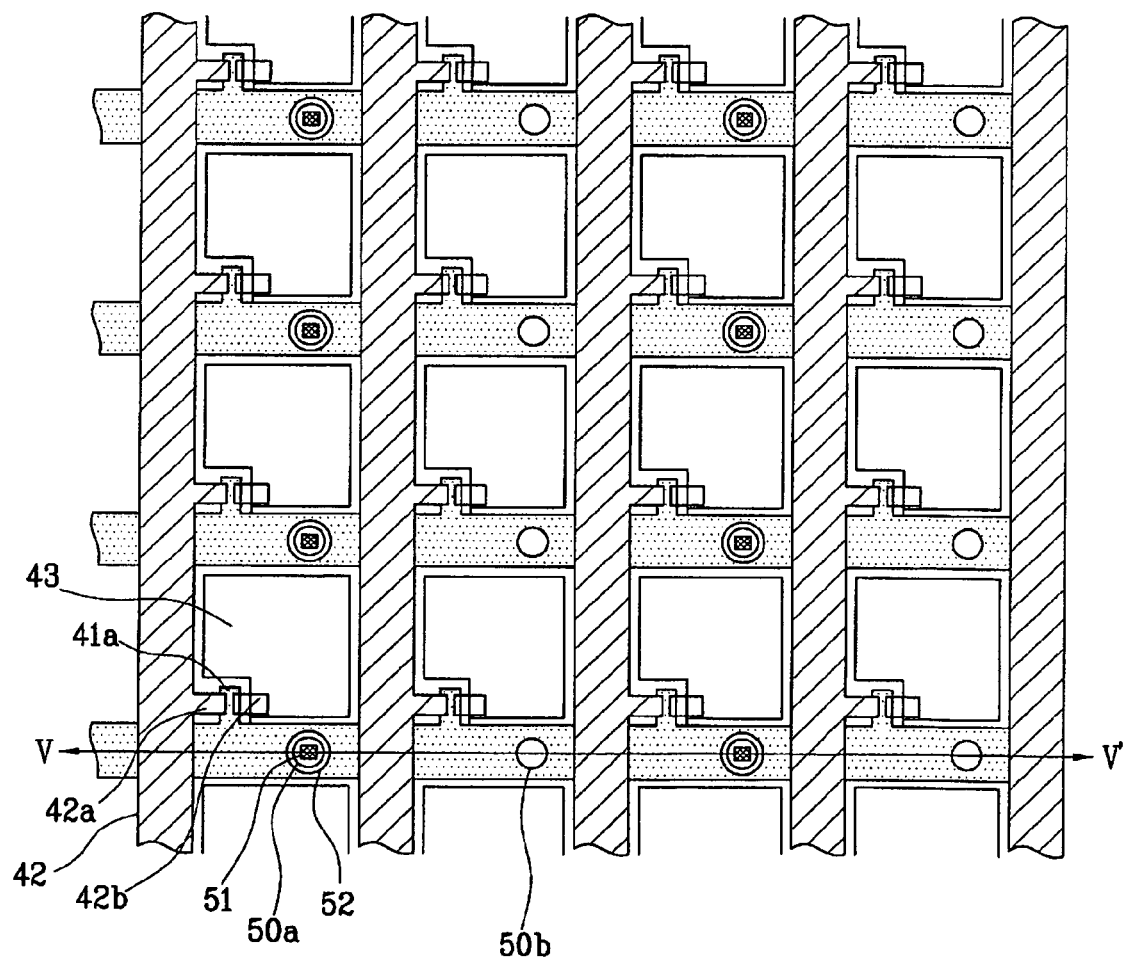
FIG. 9 is a plan view illustrating a liquid crystal display device in accordance with a second embodiment of the present invention.

FIG. 9 is a plan view illustrating a TN mode LCD device in accordance with a second embodiment of the present invention. The cross-sectional view taken along line V-V' of FIG. 9 would be the same as the cross-sectional view taken along the same area of the IPS mode LCD device in accordance with the first embodiment of the present invention, and therefore, a detailed configuration thereof refers to FIG. 7.

The structure of the TN mode LCD device will be explained in detail. The first color filter substrate 100 includes the black matrix layer 31 formed on the first glass substrate 30 for blocking light through regions corresponding to gate lines, data lines, and thin film transistors; the red, green, and blue color filter layers (not shown) corresponding to the pixel regions for creating color tones; and a common electrode (not shown) formed over the entire surface of the first substrate 100, including the black matrix layer 31 and color filter layer (not shown). The plurality of first and second column spacers 50a and 50b are formed on the common electrode (not shown) at predetermined positions on the common electrode. The first and second column spacers 50a and 50b are made of photosensitive resin.

The second TFT substrate 200 facing the color filter substrate 100 includes: a plurality of gate lines 41 and data lines 42 arranged on the second glass substrate 40 perpendicular to each other to define the pixel regions; the pixel electrodes 43 formed at the respective pixel regions; and the TFTs formed at crossings of the gate lines 41 and data lines 42. The plurality of protrusions 51 are arranged on the gate lines 41 at positions corresponding to the first column spacers 50a. The protrusions 51 are formed via deposition of the semiconductor layer 44 and data line material.

Each of the protrusions 51 has a laminated structure including the first protrusion pattern 44a and second protrusion pattern 42c over the first protrusion pattern 44a. The first protrusion pattern 44a is formed via patterning of the semiconductor layer 44 on the gate insulation film 45. The second protrusion pattern 42c is formed simultaneously when the source and drain electrodes 42a and 42b are formed at opposite sides of the patterned semiconductor layers 44.

Each protrusion 51 contacts a center portion of the upper surface of the associated first column spacers 50a. A recess 52 is formed in the second substrate 200 surrounding the protrusion 51 and having an outer periphery beyond the corresponding periphery of the upper surface of the first column spacer 50a.

The recesses 52 are formed by patterning certain portions of the gate insulation film 45 and passivation film 46, which are stacked on the glass substrate 40 of the second substrate 200 in sequence. Alternatively, the recesses 52 may be formed by patterning predetermined portions of only the passivation film 46.

The manufacture of the TFT, pixel electrode, and recess begins by depositing a metal material, such as Mo, Al or Cr, over the second glass substrate 40. The metal material is then patterned via a photolithography process to form the plurality of gate lines 41, gate electrodes 41a, common lines 47, and common electrodes 47a simultaneously. More specifically, the gate electrodes 41a protrude from the gate lines 41 at predetermined positions in the pixel regions.

Subsequently, an insulation material, such as SiNx, is deposited over the glass substrate 40 having the gate lines 41 and gate electrodes 41a, to form the gate insulation film 45. Thereafter, a semiconductor layer is deposited on the gate insulation film 45. The deposited semiconductor layer is then patterned, to form the semiconductor layers 44 on the gate insulation film 45 over the gate electrodes 41a. The semiconductor layer 44 is formed by sequentially depositing an amorphous silicon layer or poly-silicon layer and a silicon layer doped with a high density impurity, and subsequently, patterning both the amorphous silicon layer(or poly-silicon layer) and doped silicon layer simultaneously. Then, a metal material such as Mo, Al or Cr, is deposited, the metal material is patterned by use of a photolithography process, to form the plurality of data lines 42 perpendicular to the gate lines 41. Then, the source and drain electrodes 42a and 42b are formed contacting opposite sides of the semiconductor layers 44, respectively. The source electrodes 42a protrude from the data lines 42a.

Simultaneously during the formation of the source and drain electrodes 42a and 42b, the second protrusion pattern 42c is formed on the first protrusion pattern 44a. As a result, the plurality of protrusions 51 are formed of the first protrusion pattern 44a and second protrusion pattern 42c.

Thereafter, the passivation film 46 is deposited over the entire surface of the second substrate 200, including the source and drain electrodes 42a and 42b. Although the passivation film can be made of an inorganic material, such as SiNx, an organic material having a low dielectric constant, such as BenzoCycloButene (BCB), Spin On Glass (SOG), or Acryl, can be used to improve the aperture ratio of liquid crystal cells.

Subsequently, certain regions of the passivation film 46 over the drain electrodes 42b are selectively etched to form drain contact holes for exposing a part of the respective drain electrodes 42b to the outside. Simultaneously during the formation of the drain contact holes 54, the recesses 52 are formed by removing certain regions of the passivation film 46 and gate insulation film 45 corresponding to the outer periphery of the upper surface of the respective first column spacers 50a. The formation of the recesses is accomplished in the same manner as that of the IPS mode LCD device according to the first embodiment of the present invention as shown in FIGS. 8A and 8B, and thus, no detailed description thereof will be given.

Next, a transparent conductive film is deposited over the passivation film 46, so as to be electrically connected to the drain electrodes 42b through the drain contact holes 54. The deposited transparent conductive film 56 is then selectively removed, to form the pixel electrodes 43 at the respective pixel regions. As shown in FIG. 8C, the transparent conductive film 56, which is deposited for forming the pixel electrodes 43, can also deposited over the recesses 52 and the passivation film 56 on the protrusion 51 to serve as a protective film for the gate electrodes 41a at the bottom of the recesses 52.

Although not shown, processes for forming orientation films over the color filter array substrate 100 having the first and second column spacers 50a and 50b and over the TFT array substrate 200 having the recesses 52, respectively, may be included in the TFT array process and color filter array process.

Although the above description explains that the column spacers are formed at the color filter substrate and the recesses are formed at the TFT substrate, embodiments of the present invention are not limited thereto, and it should be understood that the column spacers may be formed on the TFT substrate and the recesses may be formed on the color filter substrate.

As apparent from the above description, with an LCD device and a method for manufacturing the same according to the present invention, if an excessive pressure is applied to a surface of the first or second substrate, the upper surface of each first column spacer still only contacts the protrusion because of the recess surrounding the protrusion. Therefore, a gap is maintained between the first substrate and the second substrate without an increase in contact area between elements of the first substrate and the second substrate. This has the effect of reducing the risk of a touch defect caused by an increased contact area between the region of the upper surface of the column spacer and other elements of the first substrate facing the column spacer.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   first and second substrates bonded to each other;
   first column spacers on the first substrate;
   protrusions on the second substrate that contact a portion of an upper surface of the first column spacers;
   recesses in the second substrate surrounding the protrusions; and
   a liquid crystal layer between the first and second substrates.

2. The liquid crystal display device as set forth in claim 1, wherein each of the recesses has an inner diameter wider than a width of the associated protrusions and an outer diameter wider than the upper surface of each of the first column spacers.

3. The liquid crystal display device as set forth in claim 1, further comprising:
   second column spacers on the first substrate corresponding to regions of the second substrate other than where protrusions are located.

4. The liquid crystal display device as set forth in claim 1, wherein the first substrate includes:
   a black matrix layer on the first substrate; and
   color filter layers on the black matrix layer.

5. The liquid crystal display device as set forth in claim 4, further comprising a common electrode on a surface of the first substrate.

6. The liquid crystal display device as set forth in claim 1, wherein the second substrate includes:
   gate lines and data lines arranged on the second substrate perpendicular to each other to define pixel regions;
   thin film transistors at crossings of the gate lines and data lines;
   an interlayer gate insulation film interposed between the gate lines and data lines;
   pixel electrodes positioned in the pixel regions; and
   an interlayer passivation film interposed between the data lines and the pixel electrodes.

7. The liquid crystal display device as set forth in claim 6, further comprising common electrodes positioned alternately with the pixel electrodes.

8. The liquid crystal display device as set forth in claim 6, wherein the recesses are formed by removing portions of the gate insulation film and passivation film.

9. The liquid crystal display device as set forth in claim 6, wherein the recesses are formed by removing portion of the passivation film.

10. The liquid crystal display device as set forth in claim 6, wherein each of the thin film transistors includes:
    a gate electrode protruding from the gate lines;
    a source electrode protruding from the data lines;
    a drain electrode formed in the same layer as the source electrode and spaced apart from the source electrode; and
    a semiconductor layer over the gate electrode and overlapped by the source and drain electrodes.

11. The liquid crystal display device as set forth in claim 10, wherein each of the protrusions has a double layered structure including a semiconductor layer pattern, and an upper metal layer pattern laminated on the semiconductor layer pattern, the semiconductor layer pattern in the same layer as the semiconductor layer, and the metal layer pattern in the same layer as the source and drain electrodes.

* * * * *